United States Patent [19]
Cook

[11] Patent Number: 5,895,453
[45] Date of Patent: Apr. 20, 1999

[54] METHOD AND SYSTEM FOR THE DETECTION, MANAGEMENT AND PREVENTION OF LOSSES IN RETAIL AND OTHER ENVIRONMENTS

[75] Inventor: Kathleen Cook, New York, N.Y.

[73] Assignee: STS Systems, Ltd., Québec, Canada

[21] Appl. No.: 08/703,865

[22] Filed: Aug. 27, 1996

[51] Int. Cl.$^6$ .................................................... H04N 7/18
[52] U.S. Cl. ................... 705/22; 705/22; 705/16; 705/21; 348/150; 348/153; 349/150
[58] Field of Search ................ 705/22, 21; 348/150, 348/153; 349/150

[56] References Cited

U.S. PATENT DOCUMENTS

| | | | |
|---|---|---|---|
| 4,145,715 | 3/1979 | Clever | 348/150 |
| 4,237,483 | 12/1980 | Clever | 348/150 |
| 4,630,110 | 12/1986 | Cotton et al. | 348/153 |
| 4,991,008 | 2/1991 | Nama | 349/150 |

*Primary Examiner*—Allen R. MacDonald
*Assistant Examiner*—Jagdish Patel
*Attorney, Agent, or Firm*—Mitchell A. Stein; Stein & Associates, P.C.

[57] ABSTRACT

Method and system for the detection of suspect sales transactions in a sales environment having point of sale devices and sales locations, having a first processor for gathering record information reflecting sales transactions that have occurred in the environment, extracting from the record information a plurality of extract records relevant to suspect transactions, and converting the extract records into a form readable by the first processor; and a second processor for reading and analyzing and inputting the converted extract records, in which the second processor performs the steps of applying a plurality of exception criteria to said converted extract records to create exception records, filtering from the exception records records indicative of suspect transactions, ranking the filtered records, applying scoring table values to said ranked, filtered records to create scored records, and outputting the scored records; and a report generator for generating reports from the scored records reflecting suspect sales transactions. The method and system are employed to determine the existence and frequency of suspect and illegal activity occurring at point of sale devices. The method and system further involve the use of surveillance cameras in which the output of the camera (whether video, film or digital) is keyed to the particular transactions in issue.

19 Claims, 12 Drawing Sheets

FIG. 12

METHOD AND SYSTEM FOR THE DETECTION, MANAGEMENT AND PREVENTION OF LOSSES IN RETAIL AND OTHER ENVIRONMENTS

FIELD OF THE INVENTION

The present invention relates to the field of detection, management and minimization of losses in retail and other sales environments, and more particularly to the detection of likely theft activity and employee errors by gathering, culling, and analysis of data followed by ranking and reporting of suspect, critical transaction records thereby minimizing the likelihood of further losses.

Nothing can damage a company more than the dishonesty of its employees. When associates focus on fraudulent activities, every aspect of a business suffers—profitability, employee morale, even customer service. Yet, once dishonest employees are on a company's payroll, the company is in a perilous position. Crafty employees can appropriate significant goods from a company—without detection. Thus careful steps must be taken to prevent thievery.

This situation is especially critical in the retail sales environment, where theft by employees, vendors and customers has chronically persisted, causing, in some extreme instances, complete failure of the institution.

To solve the problem, careful hierarchical handling of cash and charge transactions is not unusual. Employees activities can also be physically monitored. However, in these situations, additional employees are typically responsible for watching the activities of their underlings. Alternatively, cloaked surveillance cameras can be installed to record all (or some) transactions. These solutions are expensive and often inefficient or completely ineffective.

Analysis of relevant, extracted record information of specific types of transactions and trends can reveal the identity of associates (i.e., employees) whose conduct, even if well hidden, renders their honesty "suspect." Gross examples, like frequent "short" registers, will suggest that an employee is withdrawing cash from the drawer. Likewise, where line items in transactions are voided after the transaction has been completed (and the money is allegedly returned for the return of the goods) such behavior, when frequent, suggests that the money has been wrongfully pocketed.

It is thus an object of the inventions to obtain and organize specific records of storebased transactions and then analyze these records (by way of, for example, a computer program application stored in a general purpose digital computer's memory) to create record extracts, which are then further analyzed and coded to determine theft and reveal other suspect activity.

SUMMARY OF THE INVENTION

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

The foregoing objects and other objects of the invention are achieved through a method and system for the detection of suspect sales transactions in a sales environment having point of sale devices and sales locations, having a first processor for gathering record information reflecting sales transactions that have occurred in the environment at the point of sale devices and sales locations, extracting from the record information a plurality of extract records relevant to suspect transactions, and converting the extract records into a form readable by the first processor; and a second processor for reading and analyzing and inputting the converted extract records, in which the second processor performs the steps of applying a plurality of exception criteria to said converted extract records to create exception records, filtering from the exception records records indicative of suspect transactions, ranking the filtered records, applying scoring table values to said ranked, filtered records to create scored records, and outputting the scored records; and a report generator for generating reports from the scored records reflecting suspect sales transactions. The method and system are employed to determine the existence and frequency of suspect and illegal activity occurring at point of sale devices. The method and system further involve the use of surveillance cameras in which the output of the camera (whether video, film or digital) is keyed to the particular transactions in issue.

In short, the subject invention provides records and reports in a cross-referenced manner by exceptions, rather than by a report orientation. Cross-referencing of multiple criteria are performed by a computer, removing the burden to do so from human intervention. Four very summarized exception lists are produced by the system: associate, credit account, register and store. Each exception list employs multiple, scored criteria to select the top associates, credit cards, registers or stores for consideration as being involved in fraudulent activity.

Supporting the exception lists are a number of on-request reports which focus on activities which should be reported, regardless of whether they are combined with other, potentially fraudulent activities. In addition, case studies of associates, credit cards and registers are supplied, which provide access to the detail level of transactions, on request.

For comprehension of the technology set forth herein, the following terms are defined:

Transaction: a complete event occurring at the point of sale ("POS") register. Each register and each transaction is numbered. For example, a sale at Register 001, Transaction 12345 could contain the following:
 1 tube Crest toothpaste @$1
 1 bottle Revlon shampoo @$2
 1 package Duracell AA batteries @$2.
In this example, all three items constitute the transaction, as defined which totals $5.

Tender: the means of Payment. Tender types include, for example, cash, check, Visa, etc.

SKU: Stock Keeping Unit, which is another way of referring to a unique item. In the example above, each of the items would have a unique SKU number associated with it, which would be used for identification and tracking.

Return: a credit transaction, usually occurring because of the return of merchandise, and a key area of fraud.

Post Void: a transaction which eliminates a previously recorded transaction, which has been completed through totaling and tendering (payment). For example, transaction 12345 above could be eliminated if transaction 12346 post voids it.

Mid-Void or Cancel: a transaction which eliminates the transaction which is in process, before totaling and payment.

Line Void: the elimination of a single item in a transaction which is otherwise completed.

Cash Equivalent: a tender type which is like cash. This includes gift certificates, traveler's check, bank check, merchandise credit, etc.

Merchandise Credit: a form of tender, which is a document issued by a store and which represents a credit which can subsequently be used for purchasing merchandise. Also referred to as a due bill or store credit. Merchandise credits are usually issued on a return and redeemed on a sale.

House charge: the retailer's own store charge account. For example, a Macy's charge card would be a house charge at Macy's.

Third Party or Bank charge: a charge account which is not owned by the store, but is owned by a Bank or another party. For example, this includes American Express, Visa, and other credit card or bank card companies.

No Receipt Return: a merchandise return which was made without evidence of a purchase. Often, stores enter data from the receipt into the POS register, if a receipt is present; lack of this data indicates lack of a receipt.

Organizational Group: a geographic or managerial cluster of stores. For example, many retailers organize stores into geographical areas called a region, which are composed of multiple districts.

Store classification: a non-geographic means of grouping stores according to some like characteristic. This can include, for example, stores which have high inventory shortage, stores which have sales from $1–$3 million, stores which have square footage from 10,000–15,000, and the like.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters denote similar elements through the several views:

FIG. 12 is an example of an exception list generated in accordance with the invention.

DETAILED DESCRIPTION OF THE PREFERRED EMBODIMENTS

In accordance with the subject invention, data records evidencing transactions are received and polled from various client facilities. "Client" refers to a host retail or other environment in which is installed part or all of the "LPM" System or "Loss Prevention Management System" in accordance with the preferred embodiments, or the origination locations of data. Records are obtained from a number of sources, reflecting sales or other activities, and are thereafter processed by another portion of the LPM System, as discussed below. It should be appreciated that part or all of the LPM System can be installed at a client site or at any other location provided the location permits data acquisition from the client, or from one or more client-designated locations, either via direct connection, modem links, or any other means known to one of ordinary skill in the art (cable, telephone, satellite, or the like). Likewise the LPM System, while shown in a preferred embodiment to exist on a PC, can be installed in any of a number of processing locations including client-server environments, mini and mainframe computers, and can generate records and reports through any of a number of vehicles available to those skilled in the art, in full conformity with the scope of the invention. Code can be written in any of a number of forms or languages to run in accordance with the invention. The code can be in a source code to compiled language, or in a so-called platform language, provided that the logic follows the flows and direction set forth herein.

Figure 1:
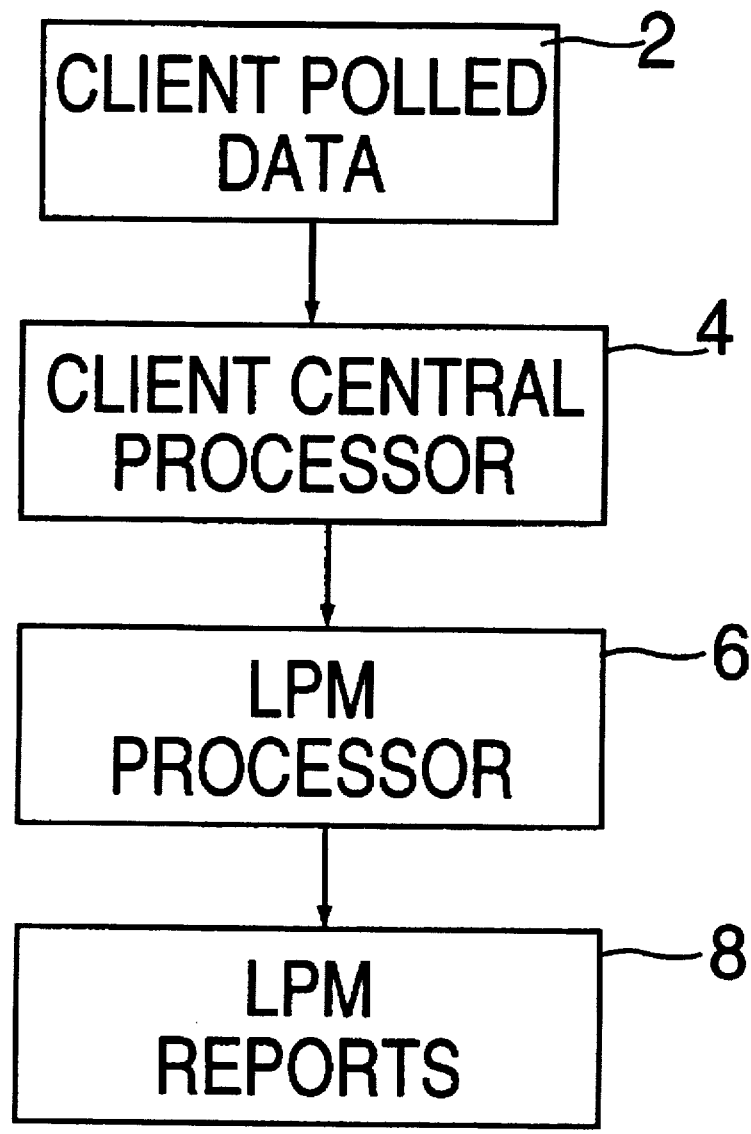
FIG. 1 is an overview flow diagram of the system and method in accordance with a preferred embodiment of the subject invention.

FIG. 1 shows a general overview flow diagram of the invention, wherein client data records 2 are polled from a number of sources. Client central processor 4 receives or extracts part or all of the data polled. Thereafter, the data is output from processor 4 to the LPM processor 6 for the generation of certain LPM reports 8, all as more fully described below.

Polled data 2 is received from a number of different sources, typically multiple stores (in, e.g., a retail environment) and multiple locations within each store. In essence, the invention must receive complete, accurate data from the client tagged to locations and personnel, in order to link the resultant records produced herein to the likely suspect locations and personnel who may be involved in a theft or other improper misappropriating conduct. Thus, within each store there are also typically multiple sources of data. The goal is to gather from either target stores, i.e., stores in which losses are suspected, or in general from all stores to thereafter analyze for target stores and/or sales.

After the client polls its data records, it ordinarily applies its own internal sales audit system to such data. This system exists, in typical fashion, in processor 4, which generally organizes the data and sets forth financial balancing to ensure transactions are complete. Typically also installed in the client's processor 4 is a translation engine designed to take the data records from the client's facilities, stored in processor 4, and extract and format the records into a form for later processing. It should be appreciated that the subject invention will analyze data records regardless of the source, and one of ordinary skill in the art will comprehend that the data record acquisition process can be performed in a number of different methods without deviating from the scope, spirit or intent of the invention.

Figure 2:
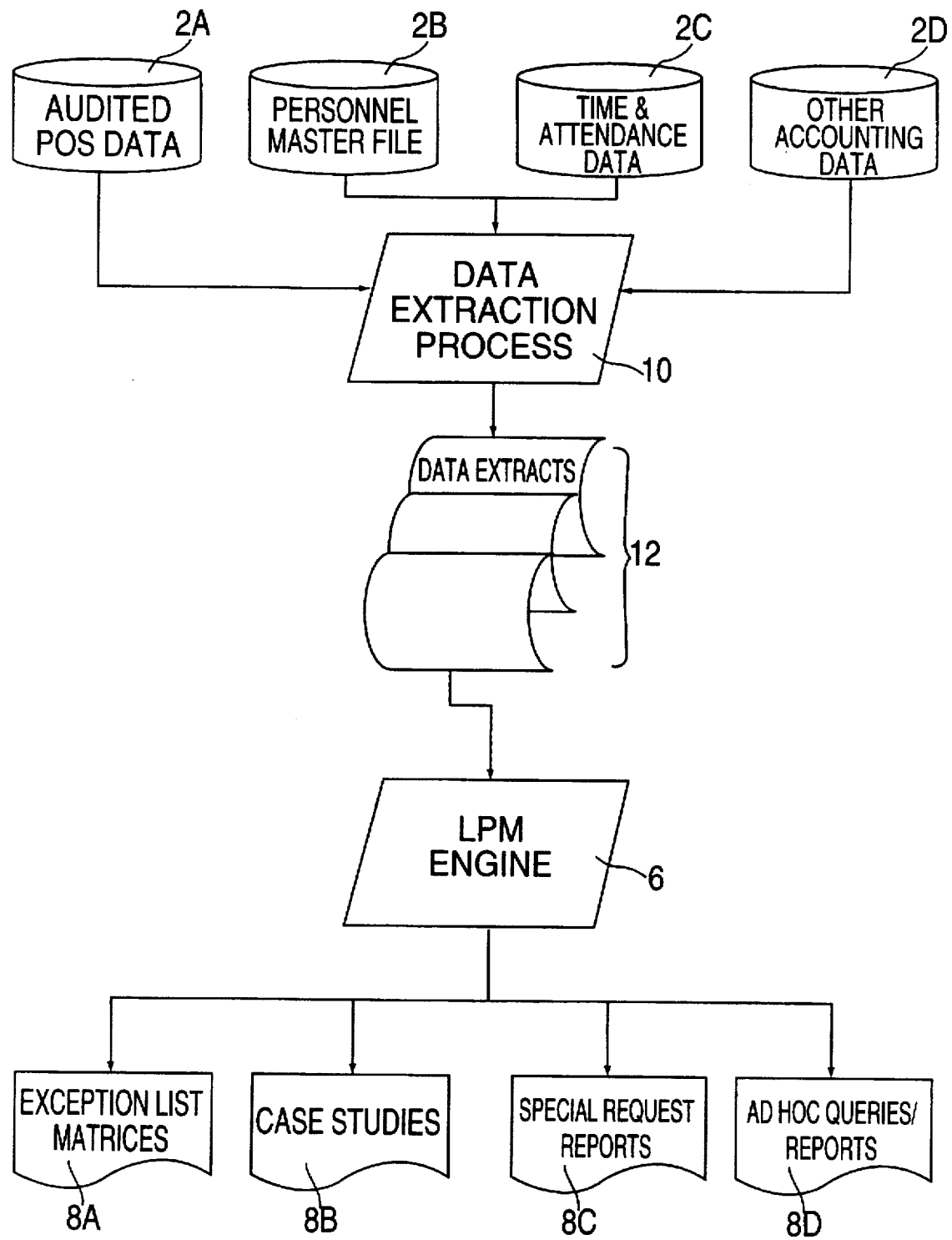
FIG. 2 is a flow diagram detailing the data extraction process, LPM engine and report generation elements of the invention as shown in FIG. 1.

As shown more specifically in FIG. 2, records comprising client polled data records 2 (from FIG. 1), are analyzed in accordance with the subject invention, and are generally grouped into four categories—2A, 2B, 2C and 2D. Audited POS data 2A reflects existing data records culled from various point of sale devices as in, e.g., sales registers. Personnel master files 2B generally set forth lists of employees and other identifying features. Such files 2B are needed so that suspect transactions can be keyed back to the employee and location in which the transaction occurred. Time & attendance data 2C, an optional data record, indicates time-clock data records for particular employees. In this manner, the system provides tracking for suspect employees based upon their physical presence at the time of the transactions in issue, at the client facility. Other accounting data 2D references other store-specific data including, e.g., over/short data, balances of individual registers and the like, while generally not including ledger or balance sheet type information, which is not required for the subject invention. The more comprehensive the data records supplied, the greater detail the subject invention will provide with respect to the exception reports generated, as discussed in greater detail below.

The four categories of data records 2A, 2B, 2C and 2D are processed by data extraction process 10 to render data extracts 12. Process 10 is typically fashioned to be performed at regular, routine, periodic, scheduled intervals, as in weekly or daily, and is not designed to run in continuous mode. Process 10 thus collects data records from sources 2A through 2D, and extracts relevant record-based information for later processing by LPM Engine 6. Under a currently preferred embodiment, data extract records 12 are configured as ASCII delimited file extracts, in separate, identifiable record bases, because this form is presently easier for language manipulation by the LPM engine 6. Nonetheless, any form or format can be employed provided it is recognizable by the engine 6.

Data extracts 12 are generally first sorted by suspect categories of records. While suspect categories can be modified dependent upon conditions, specifics of a client, or other parameters, presently preferred suspect categories of record information include the following: (a) Sales of selected types. This category includes, for example, credit card sales, sales with any form of a discount, and sales with price overridden at the register. This initial screening is used to eliminate records that have limited applicability to the desired identification and analysis of suspected theft and other improper activity. (b) Merchandise returns. Perhaps the most important category, when merchandise is logged as having been returned and money has been refunded, fraud may have occurred. Where a register or employee, for example, has a frequency of such returns, further investigation is required. Thus, data records as screen and file extracts are organized to show the recording of merchandise returns. (c) Associates' Purchases. Associates, i.e., employees, are often given discounts and other incentives to purchase, but can seek to abuse such privileges. Since employee theft is a significant target, observation of employee purchasing activity is critical. (d) Post-voided transactions, Mid-voided transactions, Line Item Voids. There are essentially the three types of voids for transactions. "Post" occurs after the transaction is completed. "Mid" occurs prior totalling and accepting tender. "Line item voids" occur after the transaction is completed, and one of the line items is voided out. It should be appreciated that these instances occur at a POS. When a purchaser decides to return an item shortly after a purchase at the register where the purchase occurred, the post void is indicated, and the purchaser is entitled to return of the money for that transaction. An employee can list a post void, where one has in fact not occurred, and thereby pocket the money. Consequently these types of transactions are deemed prima facie suspect. (e) No sales. This occurs when a key is put in a register (or a button is pressed) and the drawer is opened. Obviously, when the money in the drawer can be accessed, the likelihood of theft is present. (f) Personnel File Extract. Non-confidential employee/associate identification information records are reflected in this category. (g) Time and Attendance Records. These records reflect time and attendance for employees/associates. (h) Over/Short Records for Registers/Associates. Where a register or associate's dollar or item records are not balanced, such records will either show "over" the amount of tender, or "short" of the amount of tender. Such obvious inconsistencies are grounds for concern. (i) Weekly summary records for stores, registers, associates. These are periodic summary records prepared from the records acquired on a store, register and associate basis. Details of the data record extraction process 10 are shown in greater detail in FIG. 3, and discussed hereinbelow.

Data extract records 12 created by data extraction record process 10 are then received by engine 6 for analysis. As stated above, in an advantageous embodiment these records 12 are created on a first processor, typically client central processor 4, and engine 6 is resident in another processor, which can be a personal computer. As shown in the general overview of FIG. 2, four major components of record manipulation and analysis are presented. In particular, exception list matrices 8A, case studies 8B, special request reports 8C, and ad hoc queries/reports 8D are created.

Figure 6:
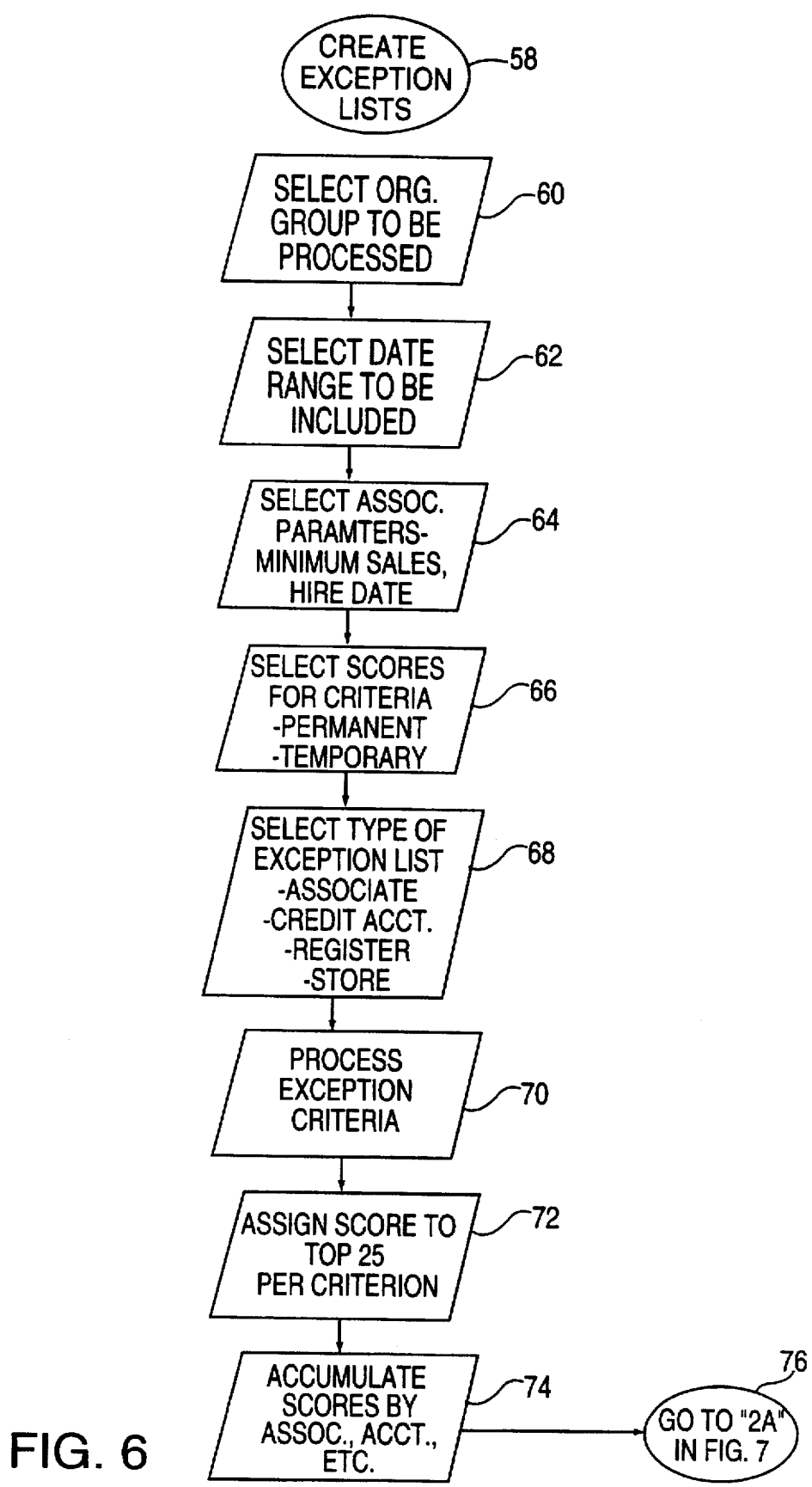
FIG. 6 is a flow diagram showing the creation of exception lists through accumulation of scores.
Figure 7:
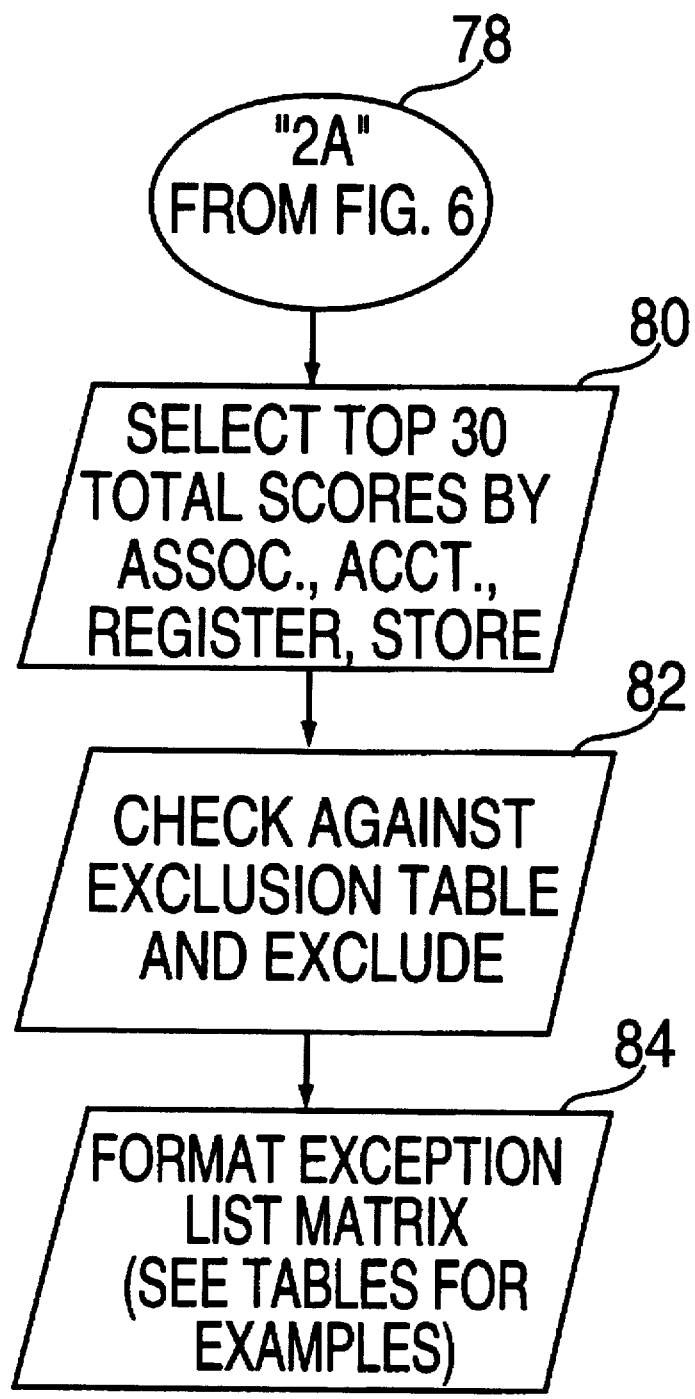
FIG. 7 is a flow diagram showing the completion of exception list matrices in accordance with a preferred embodiment of the invention.

Exception list matrices 8A typically, in an advantageous embodiment, include specific record reports by associates, credit accounts, registers and stores as shown in FIGS. 6 and 7 and discussed below. In general, all completed transactions (totalled and received payment) are analyzed based upon multiple potentially fraudulent criteria. The top occurrences (e.g., 25) of transaction records in each of the four categories are listed, a score is associated from scoring tables against each one, and totalling and cross-referencing is provided.

Case studies 8B (shown in greater detail in FIG. 9) allows preferential organization of data records by person, credit card, register, at the user's request. Thus, if the user views certain exception list reports and determines that further investigation is needed of any of the foregoing specific fields, then case studies 8B are generated.

Special request reports 8C (shown in greater detail in FIG. 10) provides specific situations, at the user/client's request, where, for example, certain fields that are not cross-referenced with any other transaction, but are highly likely to be fraudulent, are sought. For example, where an associate has his/her own store credit card, and is ringing his/her own sales and returns, voiding his/her own transactions, processing his/her own payments and the like.

Lastly in FIG. 2, ad hoc queries/reports 8D allows the customer/client/user to perform standard queries using standard (boolean-type or other) search tools, as is known in the art.

Figure 3:
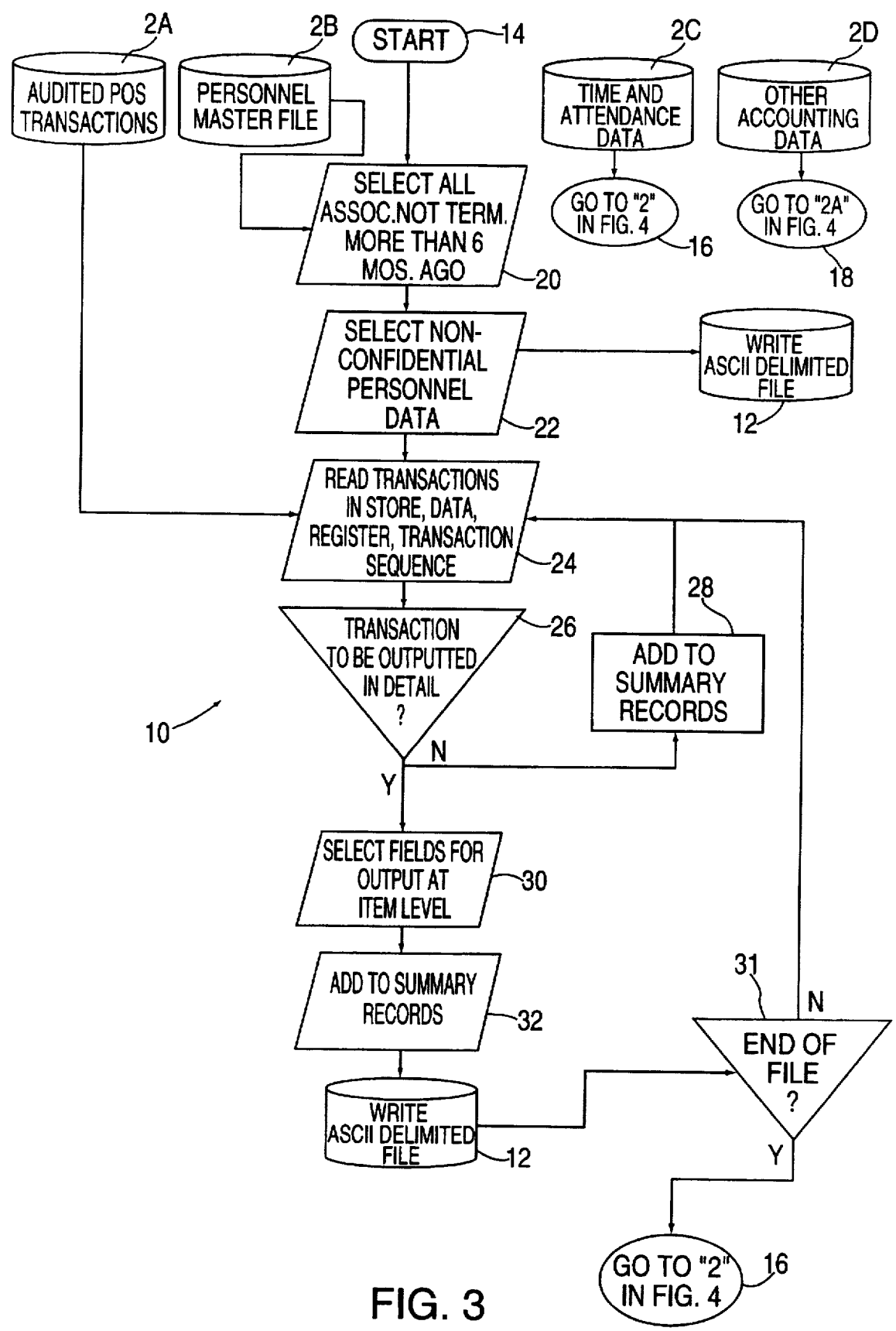
FIG. 3 is a flow diagram of data extraction process 10 with respect to audited POS data records 2A and personnel master file data records 2B, as shown in FIG. 2.

FIGS. 3 shows, in greater detail, the data extraction process 10 commencing with start 14. Time and attendance data 2C is directed to "2" in FIG. 4 by direction ellipse 16. Other accounting data 2D is directed to "2A" in FIG. 4 by direction ellipse 18. Upon commencement of the data extraction process 10 at start 14, box 20 selects all associates not terminated more than six months prior to the date of commencement from personnel master file 2B. This period of time is preferentially selected to include all associates/employees whose conduct would have meaningful significance. Thereafter, box 22 directs the selection of non-confidential personnel data from personnel master file 2B. Such data records include name, the hiring date, a designation of whether the employee is full or part time, the position of the employee, and the like. Audited POS transactions 2A are read by box 24 in store, date, register and transaction sequence. Decision triangle 26 queues for whether the transaction is to be outputted in detail. If no, the transaction is added to summary records by box 28, and the path returned to box 24. If yes, box 30 provides for the selection of fileds for output at item level. Thereafter, the records are added to summary records by box 32, and, in the preferred embodiment, ASCII delimited files are written including data extracts 12. Decision triangle 31 then queries whether the file is ended. If no, the path is returned to box 24 for continued reading. If yes, then ellipse 16 directs the path to "2" in FIG. 4.

Figure 4:
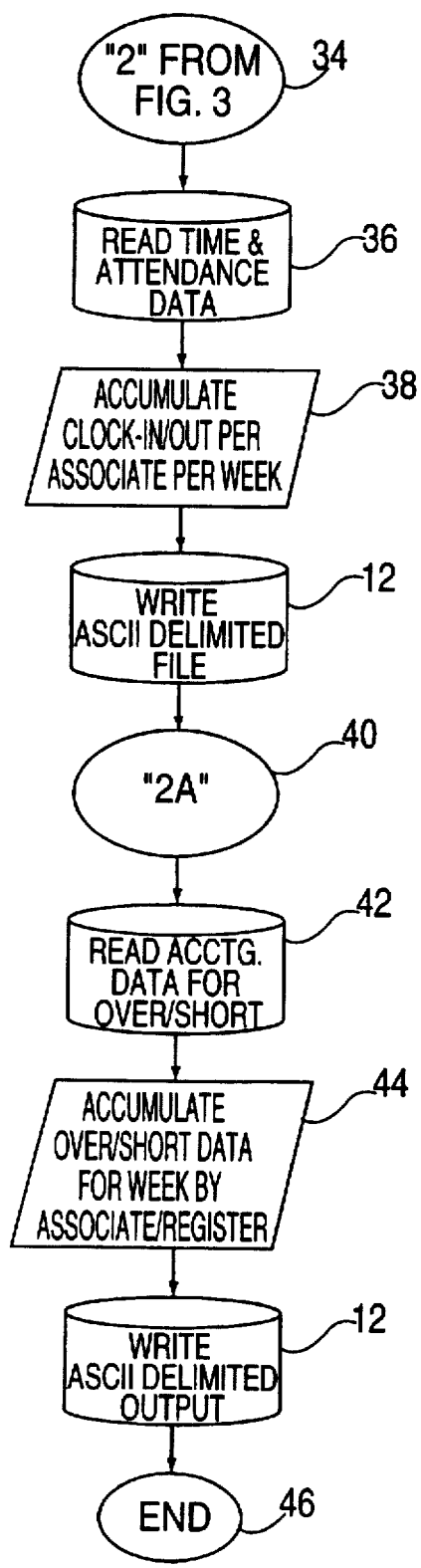
FIG. 4 is a flow diagram of data extraction process 10 with respect to time & attendance data records 2C and other accounting data records 2D, as shown in FIG. 2.

FIG. 4 originates by sphere 34 from FIG. 3. Time and attendance data is read by step 34, clock-in/out per associate per week information is accumulated by box 38, and, in this embodiment, ASCII delimited files are written by box 12. Thereafter, "2A" is commenced which represents a link from ellipse 18 in FIG. 3 to this point in the program. Accounting data representing over/short is read by step 42, and the data for week by associate/register is accumulated at box 44. Thereafter, ASCII delimited files are written including data extracts 12, and this portion of the program ends at step 46.

Figure 5:
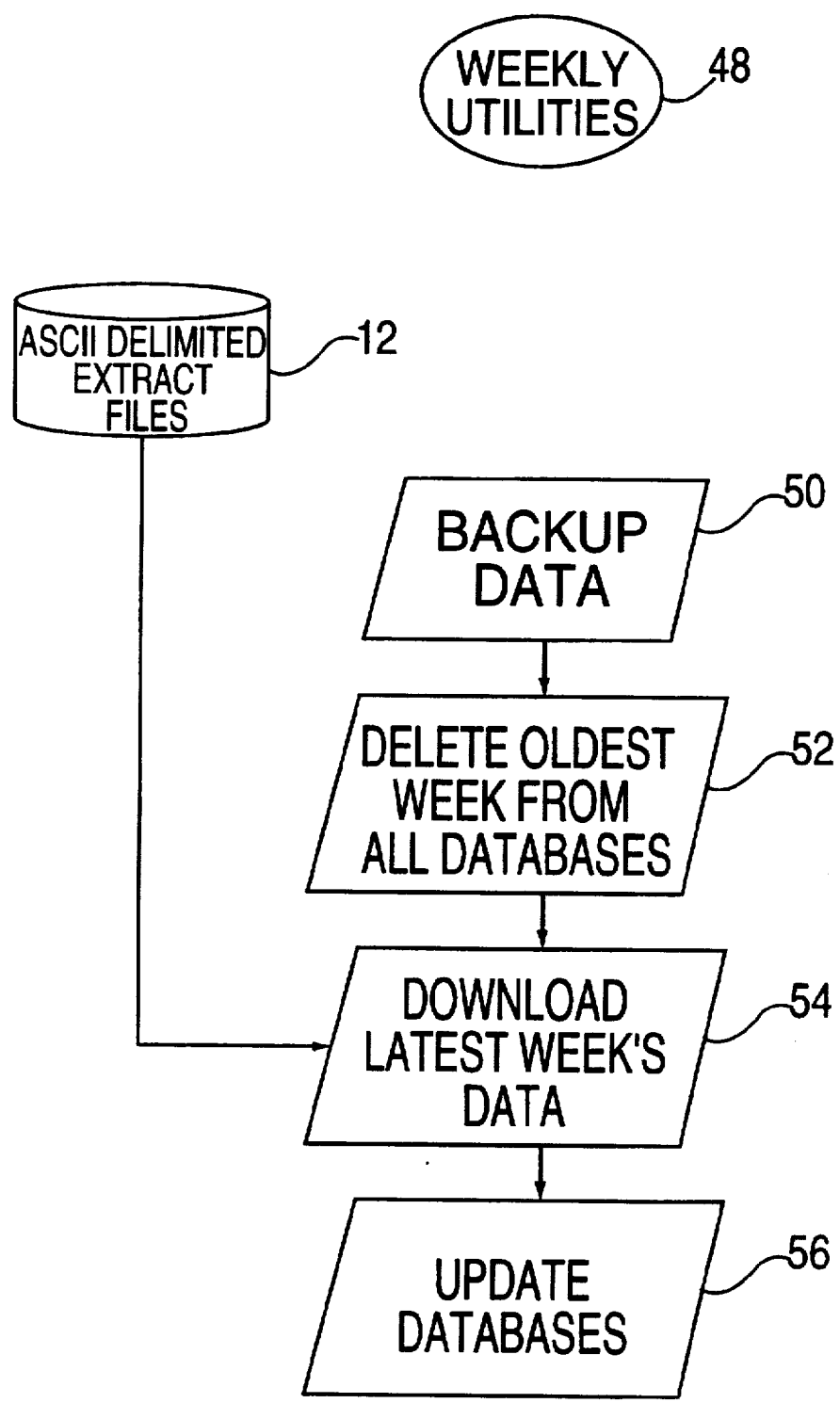
FIG. 5 is a flow diagram showing weekly utilities for processing data extracts 12 on a periodic basis.

FIG. 5 shows weekly utilities 48 which, as the name implies, occur on a routine weekly basis. Backup data occurs at box 50, followed by deletion of oldest week from all databases by box 52. ASCII delimited extract records 12 are dowloaded for the latest week by box 54, and the databases are updated by box 56.

FIGS. 6 and 7 describe the manner in which exception lists are created as shown by title sphere 58. Initially, the organizational group to be processed is selected by the user from a screen prompt which engages box 60. This selection may be of the entire company, division, region, district, store, high shrink (i.e., stores with highest inventory shortage) or other target stores. The user then selects the date range to be processed at box 62. Thereafter, the user is prompted to specify associate parameters like minimum sales, hire date which are inputted at box 64. Next, the user is prompted to select scores for criteria. Each category of potentially fraudulent activity included in the Exception List criteria has an associated score. There are two scoring tables.

First, there is a temporary scoring table which is adjustable by the user for single creation of an exception list. Scores are raised for categories which are desired as the focus. For example, raising scores on all activities involving Returns, will result in creation of an Exception List which focuses on those associates, credit account, etc. where treturn transactions are extremely likely to have been used for fraud.

Second, there is a permanent scoring table which, while adjustable by the user, is generally retained for regular runs of Exception Lists.

After selection of scores for criteria at box 66, the user then selects the type of exception list (associate, credit account, register or store, or multiples thereof). Thereafter, the exception criteria are processed at step 70. The top 25 per criterion are assigned scores against the scoring table at step 72, scores are accumulated by stores, associates, account, etc. at step 74. Direction ellipse 76 directs to "2A" as shown on FIG. 7.

Ellipse 78 in FIG. 7 carries forward from FIG. 6. The top 30 total scores by associate, account, register, and store are selected by box 80. Then, a check is made against an Exclusion Table at box 82. The Exclusion Table allows users to elect to exclude selected associate numbers, credit card numbers, or register numbers from consideration in the Exception List formulation.

Lastly, the Exception List Matrix is formated at box 84.

By way of background and greater understanding, it should be appreciated, that the user first selects a group of exceptions which are included in the associate exception list, credit card exception list, register exception list and store exception list. Approximately twenty-five exception criteria are included for each of these lists, as described below.

Explanation of Calculations

In the following list of exception criteria, most selections are based on total transactions and dollars or on percent of sales.

Total transactions is simply the sum of all the individual transactions rung by a cashier, of whatever type. Therefore, if associates are ranked on the basis of total returns, this is calculated by counting the number of return transactions rung by each unique cashier in the database, and ranking them in descending sequence on that total count. For example, the sale transaction 12345 described above (see Summary) would be counted as 1 in a count of sales transactions. The top twenty-five cashiers are selected for further processing for each exception selection.

Total dollars is a sum of the dollars rung by a cashier for all transactions of a given type. For example, transaction 12345 shown above would cause $5 to be added to total sales dollars for the cashier.

Total items is a sum of the unique items rung by a cashier for a particular transaction type. For example, transaction 12345 above would cause 3 to be added to a total item count.

Percent of sales is normally calculated on the basis of dollars. The cashier's total dollars rung for returns, for example, would be divided by the total dollars the cashier rang for sale transactions. This decimal multiplied by 100 would be the return percent of sales. When associates are ranked, they are ranked on the calculated percentage, high to low.

Exception List

The following lists exceptions which have are considered to be most preferred. Each is followed by a number or numbers indicating:

1 Primary requirements for clients
2 Secondary importance for clients
3 Highly indicative of fraudulent activity
4 Installed only at a certain type of client, because of operational uniquenesses or organizational structure.

Top Associates Ringing Cash/Cash Equivalent Returns—based on Total Transactions and
Top Associates Ringing Cash/Cash Equivalent Returns as a Percentage of Sales 1
Cash/Cash Equivalent Returns by Store, Ranked Within Region or Store Classification 4
Top Associates Ringing Cash Returns as a Percentage of Their Total Returns 1,3

Top Cash/Cash Equivalent Return Registers—based on Total Transactions and Dollars 2

Top Associates Processing Merchandise Credits as a Percentage of Sales 1

Top Associates Processing Merchandise Credits as a Percentage of their Returns Rung 2

Top Associates Processing Multiple Redemptions of Merchandise Credits 4

Top House Charge Return Register Locations—based on Total Transactions and Dollars 4

Top Associates Ringing Returns on House Charge—based on Total Transactions and Dollars Top Associates Ringing Returns on House Charge as a Percentage of Sales 1

Returns on House Charge by Store, Ranked Within Region or Store Classification 4

Top Third Party (Bank Card) Charge Return Registers—based on Total Transactions and dollars 2

Top Associates Ringing Returns on Third Party Charge—based on Total Transactions and Dollars Top Associates Ringing Returns on Third Party Charge as a Percentage of Sales 1,3

Third Party Charge Returns by Store, Ranked within Region or Store Classification 4

Top Registers Processing Returns without Receipt—based on Total Transactions and Dollars 1,3

Top Associates Ringing No Receipt Returns as a Percentage of Sales 1,3

Top Associates Ringing No Receipt Returns as a Percentage of Their Returns Rung 1,3

Top Credit Accounts with No Receipt Returns—based on Total Transactions and Dollars 1,3

Associates Ringing Their Own Returns 1,3

Top Associates Ringing Other Associates' Returns 1

Top Registers Ringing Associate Returns 1

Associate Returns by Store, Stores Ranked by Region or Store Classification 4

Associate Purchase vs. Return Summary by Store, Ranked within Region or Store Classification 4

Highest Returning House Credit Accounts—Accounts Ranked by total transactions or items 1,3

Highest Returning House Credit Accounts—Accounts Ranked by dollars 1,3

Highest Associate House Accounts with Returns—ranked by Total Transactions and Dollars 1,3

Highest Associate Accounts with Exchange Transactions— based on Total Transactions 2

Highest House Charge Accounts with No Receipt Returns 1,3

Highest Returning Third Party Charge Accounts—ranked by Total Transactions and Dollars 1,3

Highest Third Party Charge Accounts with No Receipt Returns ranked by Total Transactions and Dollars 1,3

Accounts With Multiple Returns rung by the Same Associate, but on different dates 1,3

Accounts With Multiple Returns at the Same Register 1

Top Registers Processing Returns—summary of all return transactions processed, broken down by type 4

Return Summary by Store—summary of all returns, broken down by type 4

Return Summary by Associate—summary of all returns rung, broken down by type 4

Top Associates with the Highest Average Returns—ranked by average items and average amount 4,3

Associates with Average Returns Greater than Store Average Return Amount * 1.25 (or other multiple) 4

Associates with Average Returns Greater than Store Average Return Items * 2 (or other multiple) 4

Associates with Returns Exceeding Department Average by $X or X% 4

Stores Ranked on Discounts Given Exceeding 50% (or other percent) 4

Transactions Where Item Amount and Discount Rung Net to Zero 2,3

Duplicate Original Sales Transaction on Returns 1,3

Multiple Use of Same Receipt Data on Returns 1,3

Returns Made to a Different Tender (Form of Payment) Than Original Transaction 1,3

Returns Made Before Store Opening or After Store Closing 1,3

Returns Using a Voided Transaction for Original Receipt Data 1,3

Returns to Third Party Credit Card with Original Purchase Made on A Different Account 1,3

Top Registers Voiding Cash/Cash Equivalent Transactions—based on Total Transactions and Dollars 2

Top Associates Voiding Cash/Cash Equivalent Transactions—based on Total Transactions and Dollars 2

Top Associates Voiding Cash/Cash Equivalent Transactions as a Percentage of Sales 1,3

Voids of Cash/Cash Equivalent Transactions—Stores Ranked within Region or Store Classification 4

Top Registers Voiding House Charge Transactions—based on Total Transactions and Dollars 2

Top Associates Voiding House Charge Transactions—based on Total Transactions and Dollars Top Associates Voiding House Charge Transactions as a Percentage of Sales 1

Voids of House Charge Transactions—Stores Ranked Within Region or Store Classification 4

Top Registers Voiding Third Party Charge Transactions—based on Total Transactions and-Dollars 2

Top Associates Voiding Third Party Charge Transactions—based on Total Transactions and Dollars 2,3

Top Associates Voiding Third Party Charge Transactions as a Percentage of Sales 1,3

Voids of Third Party Charge Transactions—Stores Ranked within Region or Store Classification 4

Top House Charge Accounts with Voids—by—based on Total Transactions, Items or Dollars 2

Top Third Party Charge Accounts with Voids—based on Total Transactions, Items or Dollars 1,3

Top Registers Voiding Associate Purchases—based on Total Transactions and Dollars 2

Top Associates Voiding Associate Purchases—based on Total Transactions and Dollars 1

Voids of Associate Purchases by Store—Stores Ranked 4

Associates Voiding their Own Purchases 1,3

Credit Accounts with Multiple Voids by the Same Associate on Multiple Dates 1,3

Credit Accounts with Multiple Voids at the Same Register on Different Dates 2

Voids of Charge Account Payments 4

Voids of Layaway Payments 4,3

Void Summary by Register—summary of all voids with breakdown by type 4

Void Summary by Associate—summary of all voids with breakdown by type 2

Voids not Rung Within Five Transactions of Original Transaction 1,3

Voids Rung by Different Associate than Original Transaction 4,3

Associates Voiding Transactions which are Subsequently Used as Original Receipt on a Return Cash Void Followed by a No Sale Within X Transactions 1,3

Top Associates Processing Mid-Voids (Transactions Cancels) as a Percentage of Sales 2

Top Associates with Mid-Void Transactions—based on Total Transactions 2

Associates Processing Mid-Void of a Cash Transaction Followed by a No Sale 2

Top Registers Ringing No Sales—based on Total Transactions 4

Top Associates Ringing No Sales—based on Total Transactions 2

Top Associates Processing No Sales as a Percent of Sales 1

Average No Sales by Store—Ranked Within Region or Store Classification 4

No Sale Transaction Immediately Following a Price Verify 4

Top Associates Ringing Other Associates' Purchases 2

Associates Ringing Their Own Purchases 1.3

Associate Purchases with Discount Greater Than X% 1.3

Associate Purchases with Discount and Markdown Exceeding X% 2.3

Sales in a User-Specified Department Which Fall Below $X 4.3

Sales Netting to Less Than $X which Contain Line Items Voided 2.3

Top Associates Redeeming Store Credits as a Percentage of Sales 2

Associates with Multiple Redemptions of Same Store Credit 1.3

Associates Processing Sales With Price Charged Varying from recorded System price for an item—ranked on total transactions, percent of sales, etc. 2.3

Orphan Voids—Void of a Purchase Not Followed by a Subsequent Sale of the Same Item 1.3

Associate Numbers Used to Ring Transactions when Associate is not Clocked In 2.3

Top Associates who Ring on Registers with Shortage—Occurrences or dollars 2.

Generally, clients use Exception Lists for Associates, Credit Card Accounts, Registers and/or Stores. Usually, clients choose between the Register and Store lists, depending upon their type of operation. For example, a specialty chain with two registers per store does not generally use the Register list, but will use the Store Exception List instead.

Each exception lists contains the top 30 (or another number selected by the client) performing a series of potentially fraudulent activities. Clients generally select approximately twenty-five potentially fraudulent exception criteria per list.

Associates, credit cards, registers and stores are evaluated separately, based upon the selected criteria. After they are evaluated, based upon total score assigned to all activities in which they have been involved, they are ranked and the top group is listed on the report, all as more fully described below.

The Exception Lists show such rankings. In other words, on the Associate Exception List, for example, the first associate entry is for the associate with the highest cumulative score, based upon scores for all exception criteria. Adjacent to the associate's total score are columns for all activities which were evaluated. For any activity in which the associate was ranked in the top 25 performing it, the column contains an alphabetical indicator. This indicator represents the associate's ranking.

Figure 12:
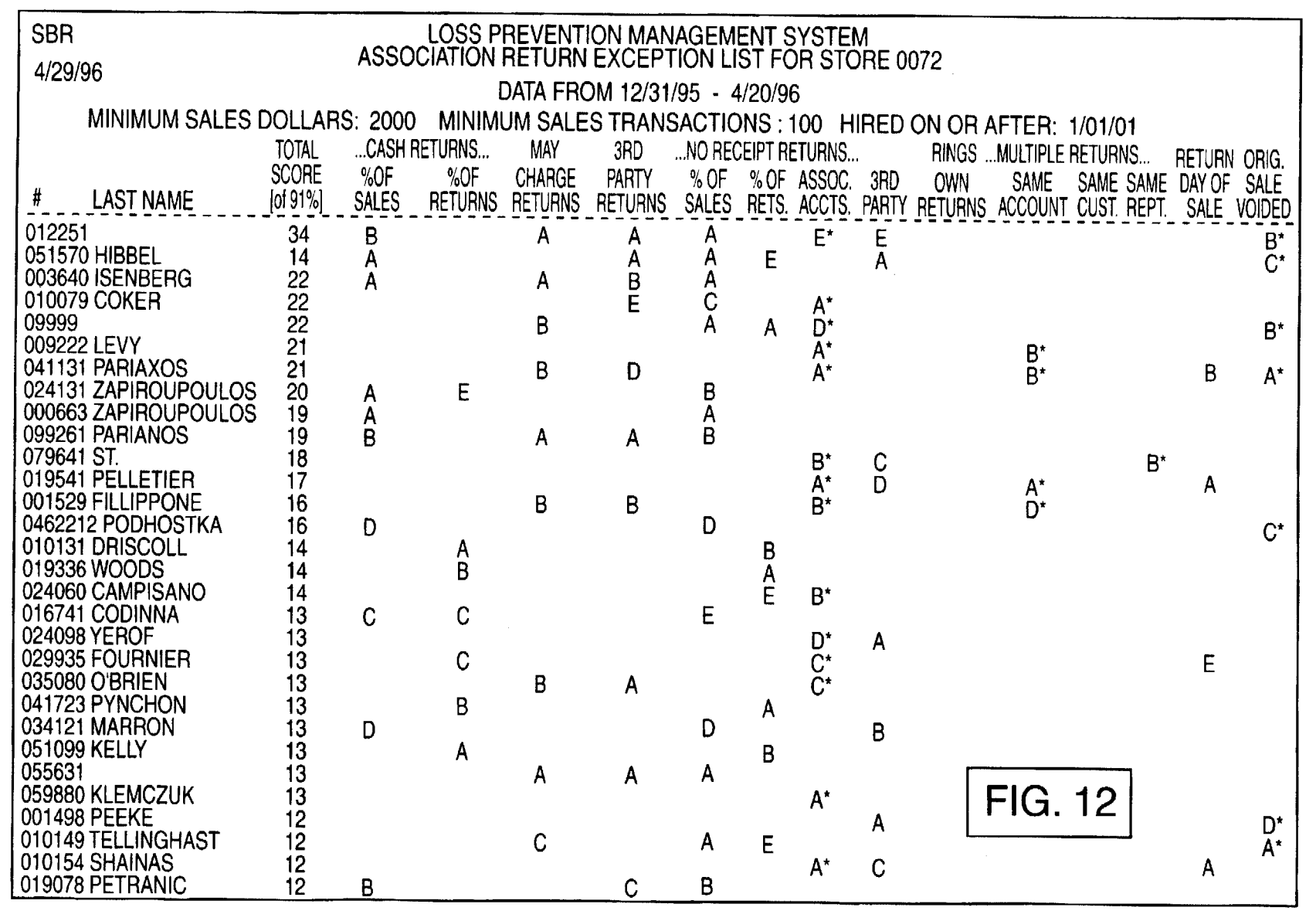

For example, if an Associate is in the Top 25 Processing Third Party Credit Cards as a percent of their Sales, the associated column on the Exception List will contain an A if the associate ranked 1–5, a B if the associate ranked 6–10, a C if the associate ranked 11–15, etc. An example List is included as FIG. 12.

After selection of the exception criteria from the sample list indicated above, each exception list (for associates, credit cards, registers and stores) is created by way of the diagrams shown in FIGS. 6 and 7. The following is an example of how the Associate Exception list is formulated.

Each exception criterion selected by the client is used to evaluate all associates who ring transactions on registers. For example, if the exception criterion is Top Associates Processing Third Party Credit Card Returns as a percentage of Sales, each associate's total returns rung to credit cards are calculated. Normally, this calculation is both a count of the transactions involved and sum of the dollars. Then, these totals are divided by the associate's own sales figures, and the resulting decimal is multiplied by 100 to yield percentage.

After calculations are performed, the associates are ranked. In the above example, associates are ranked on the calculated percentages. Top 25 associates are then selected. These top associates are assigned a score from either the permanent or temporary scoring table (see box 66 in FIG. 6). In short, each exception has a score associated with it. In addition to the score assigned to each criterion, those associates who are found to be ranked in the top five performing the activity are assigned an additional score. After all exception criteria are evaluated, for all associates, criteria are evaluated in combination. Those associates who are ranked in the top twenty-five performing certain combinations of activities are assigned a supplementary score. Finally, those associates with the top total score are selected for reporting on the Associate Exception List. These associates are displayed on the Associate Exception List, ranked on their total score.

This mechanism allows the system users to concentrate on those associates who are performing a number of potentially fraudulent activities. Further, the user need not manually cross reference a series of exception reports to determine those associates' activities most in need of review.

Scoring values for all exception criteria are assigned at the time the system is installed, but mechanisms for adjustment by users are also in place. The initial setting of the scores is based upon a combination of the designer's experience and the procedures in place at the client's site, and thus are incapable of being set forth in greater detail herein.

Figure 8:
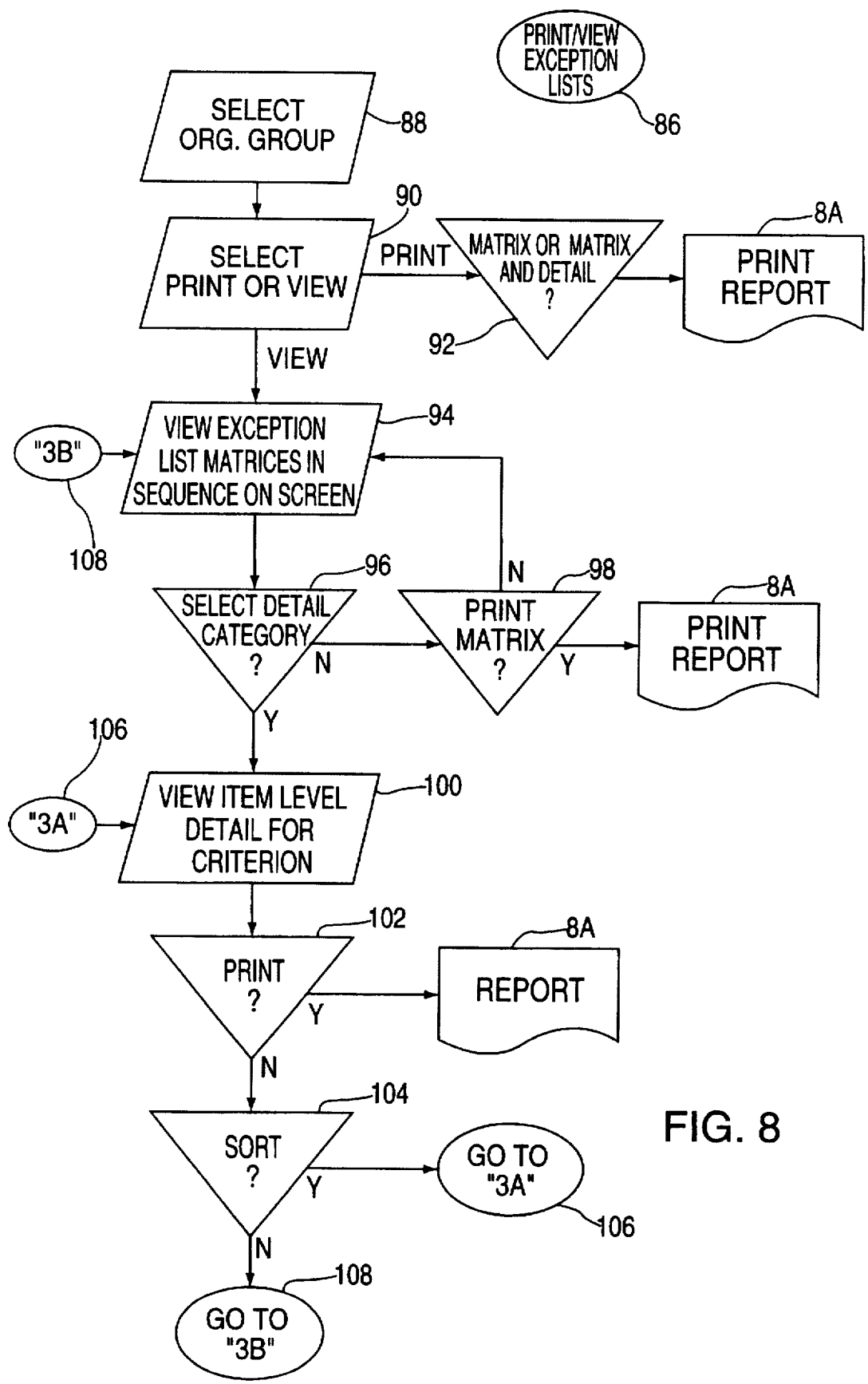
FIG. 8 is a flow diagram showing the printing and viewing procedures for exception list matrices.

FIG. 8 shows print/view functions for exception lists as shown by title sphere 86. In particular the user selects an organization group at box 88. The user then designates whether to print or view at box 90. If print is selected, the user must then determine whether the matrix is to be printed or the matrix and detail at decision triangle 92. Thereafter reports 8A are generated. If view is selected, then the Exception List Matrices are viewed in sequence on the screen pursuant to box 94. If select detail category in triangle 96 is no, then decision 98 determines whether to print the matrix (report 8A) or return to the viewing option at box 94. If select detail category in triangle 96 is yes, then view item level detail for criterion occurs at box 100. Print at triangle 102 is decided by the user (yes generates reports 8A, and no moves to sort decision at triangle 104). If sorting is sought, direction ellipse 106 directs back to box 100. If sorting is not sought, then ellipse 108 directs back to box 94.

Figure 9:
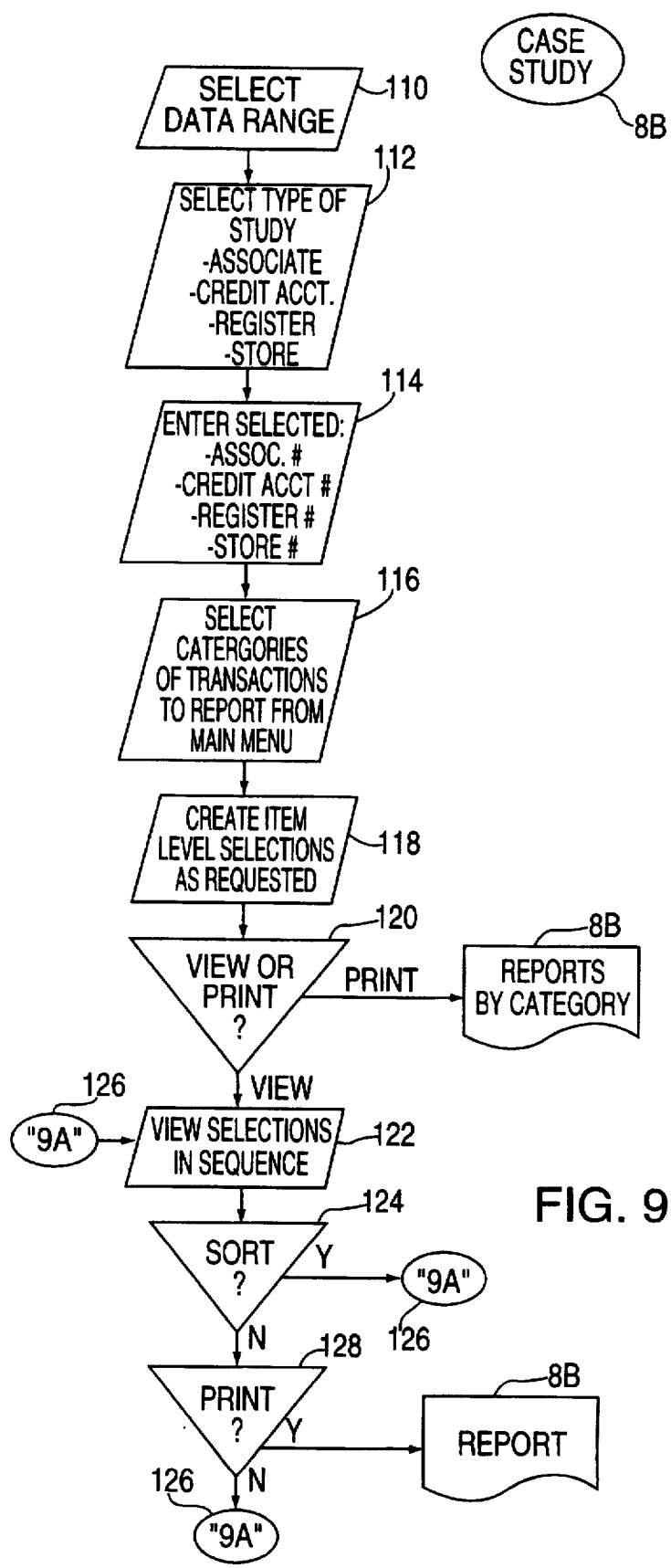
FIG. 9 is a flow diagram showing the creation of case studies reports 8B, as shown in FIG. 2.

FIG. 9 shows case studies as shown by title sphere 88. First, the user selects the date range pursuant to box 110, and then selects the type of study (associate, credit account, register, store) at box 112. The user then enters a selected associate, credit account, register or store number at box 114. The main menu is then accessed to allow the user to select categories of transactions to report at box 116. The item level selections are created, as requested at box 118. View or print decision triangle 120 allows printing of reports by category (8B) or viewing selection is sequence at box 122. Thereafter, sorting can be achieved by triangle 124 which redirects via direction ellipse 126 to position "9A" which is back to box 122. Printing of reports can be selected at triangle 128 allowing reports 8A or returning via direction ellipse 126 to box 122.

Figure 10:
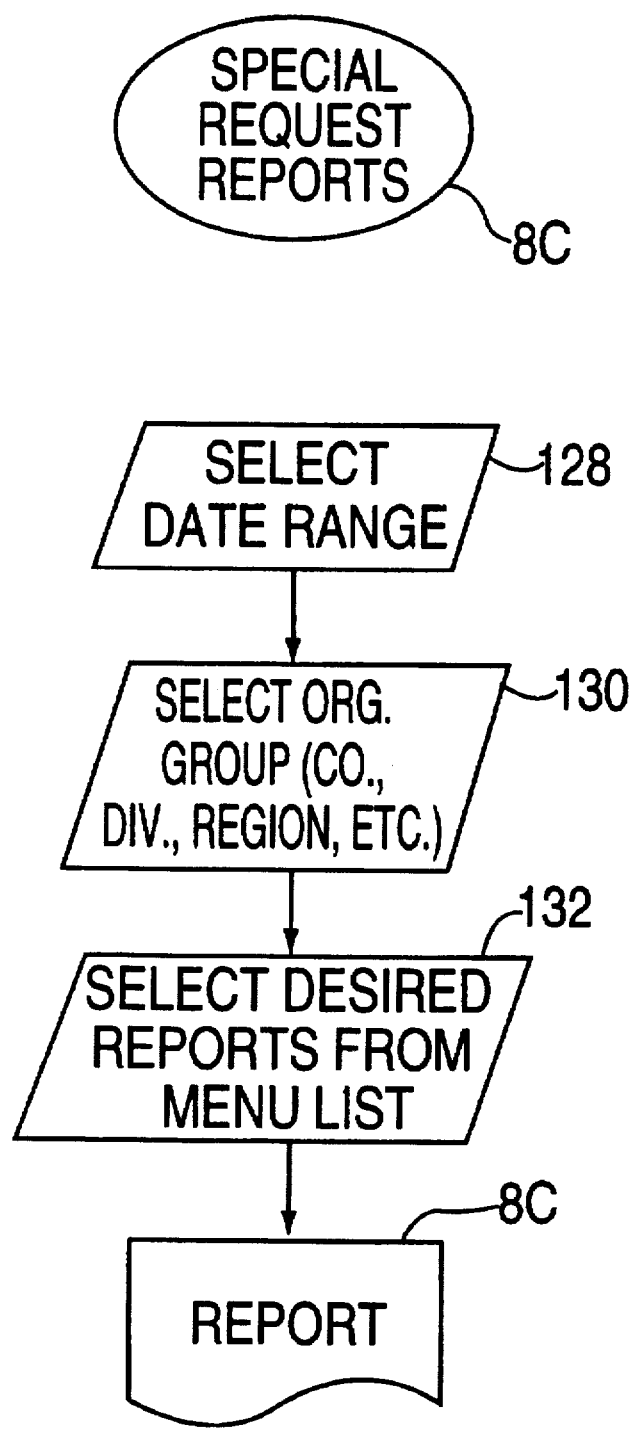
FIG. 10 is a flow diagram showing the creation of special request reports 8C, as shown in FIG. 2.

FIG. 10 shows a procedure for creating special request reports as indicated by title sphere 8C. In particular, the user selects the date range at box 128. Thereafter, the user selects the organization group (company, division, region, etc.) at box 130. The menu allows the user to select desired reports at box 132, and reports 8C are thereafter generated.

Figure 11:
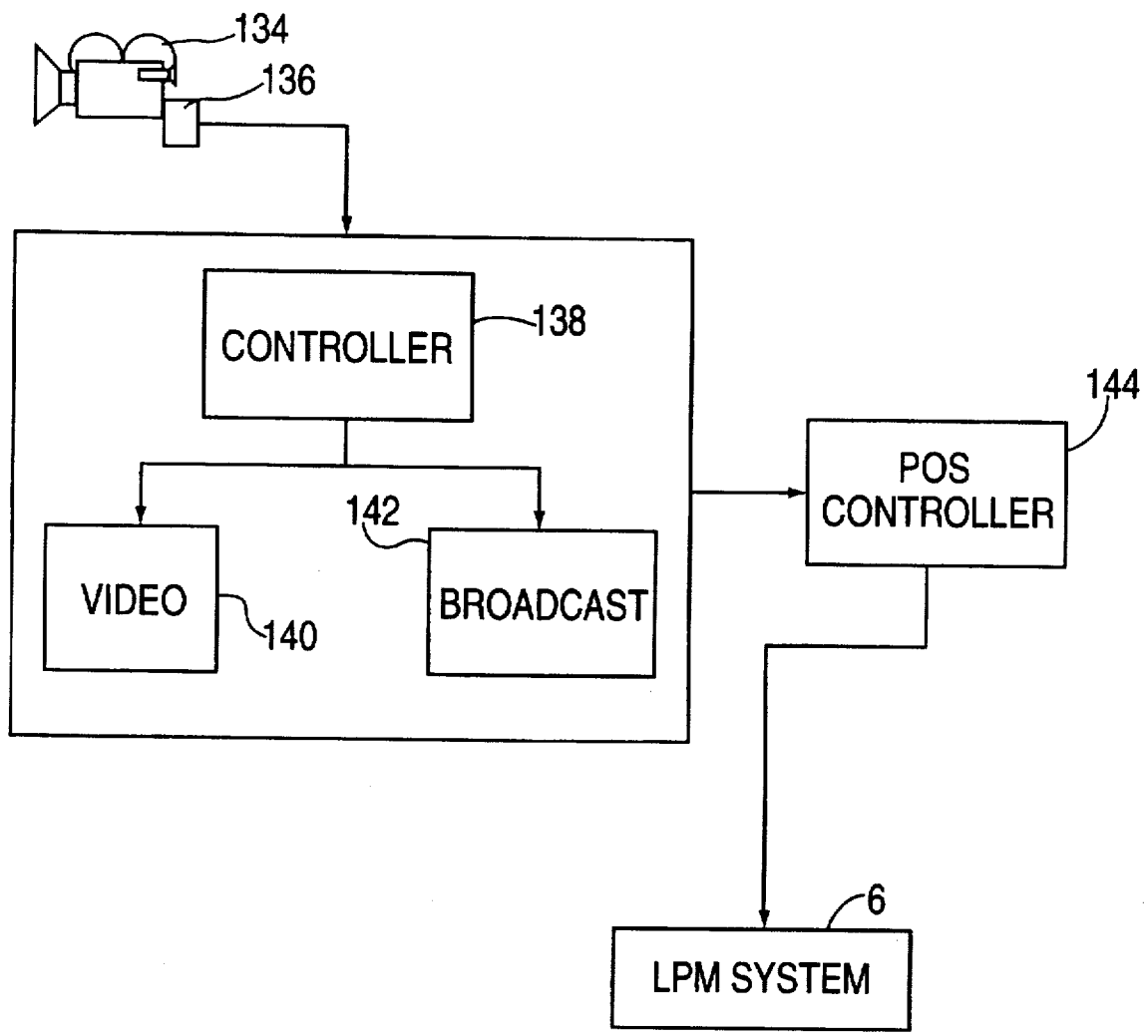
FIG. 11 is an overview diagram showing the acquisition of image data files (video, digital or otherwise) for use by the LPM system, in accordance with another embodiment of the invention.

FIG. 11 reveals an additional embodiment of the subject invention, wherein one or more cameras 134 with video/audio/broadcast output connections 136 are provided. It should be appreciated that verification of employee theft after designation of suspect transactions through the LPM engine can be achieved by cross-reference to a video image of the transactions. The output from camera 134 is controlled by controller 138, which provides a video output 140 and broadcast output 142. In this embodiment, the POS controller 144 triggers the controller 138 to engage camera 134 upon the occurrence of a transaction at the POS register, thereby filming the transaction. Either through the POS controller 144 (as shown) or, alternatively directly (not shown), the output from the controller, whether video or broadcast, can be digitized, stored, and linked to the LPM System 6. If the camera 134 is a direct-to-hard-drive digital camera, then the output can be stored at the camera or proximate thereto, and downloaded by the LPM System as needed. Obviously, the hard drive must be sufficient to include all transactions in the period prior to access by the system 6.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

I claim:

1. A method for the detection of suspect transactions in a sales environment having point of sale devices and sales locations, comprising the steps of:

(a) gathering record information reflecting transactions that have occurred in the environment at point of sales devices;

(b) extracting from said record information a plurality of extract records relevant to suspect transactions;

(c) converting said extract records into a form readable by a processor;

(d) reading and analyzing said converted extract records by said processor, wherein said processor performs the steps of:

(1) applying a plurality of exception criteria to said converted extract records to create exception records;

(2) filtering from said exception records records indicative of suspect transactions;

(3) ranking said filtered records;

(4) applying scoring table values to said ranked, filtered records to create scored records; and (5) outputting said scored records; and (e) generating reports from said scored records reflecting suspect transactions.

2. The method of claim 1, comprising the additional step of employing said scored records to determine the existence of participants in illegal activity.

3. The method of claim 1, comprising the additional step of employing said scored records to determine frequency of suspect activity occurring at point of sale devices.

4. The method of claim 1, comprising the additional step of employing said scored records to determine frequency of suspect activity occurring at sales site es.

5. The method of claim 1, wherein said extract records relevant to suspect transactions are selected from the list consisting of sales of selected types; merchandise returns; associates' purchases; post voided transactions; mid-voided transactions; line item voids; no sales, personnel file records; time and attendance records; over/short records for point of sale devices; weekly summary records for sales locations, point of sales devices and associates; and combinations thereof.

6. The method of claim 1, wherein said exception criteria are selected from the list consisting of Top Associates Ringing Cash/Cash Equivalent Returns—based on Total Transactions and dollars; Top Associates Ringing Cash/Cash Equivalent Returns as a Percentage of Sales; Cash/Cash Equivalent Returns by Store. Ranked Within Region or Store Classification; Top Associates Ringing Cash Returns as a Percentage of Their Total Returns; Top Cash/Cash Equivalent Return Registers—based on Total Transactions and Dollars; Top Associates Processing Merchandise Credits as a Percentage of Sales; Top Associates Processing Merchandise Credits as a Percentage of their Returns Rung; Top Associates Processing Multiple Redemptions of Merchandise Credits; Top House Charge Return Register Locations—based on Total Transactions and Dollars; Top Associates Ringing Returns on House Charge—based on Total Transactions and Dollars; Top Associates Ringing Returns on House Charge as a Percentage of Sales; Returns on House Charge by Store. Ranked Within Region or Store Classification; Top Third Party (Bank Card) Charge Return Registers—based on Total Transactions and Dollars; Top Associates Ringing Returns on Third Party Charge—based on Total Transactions and Dollars; Top Associates Ringing Returns on Third Party Charge as a Percentage of Sales; Third Party Charge Returns by Store. Ranked within Region or Store Classification; Top Registers Processing Returns without Receipt—based on Total Transactions and Dollars; Top Associates Ringing No Receipt Returns as a Percentage of Sales; Top Associates Ringing No Receipt Returns as a Percentage of Their Returns Rung; Top Credit Accounts with No Receipt Returns—based on Total Transactions and Dollars; Associates Ringing Their Own Returns; Top Associates Ringing Other Associates' Returns; Top Registers Ringing Associate Returns; Associate Returns by Store. Stores Ranked by Region or Store Classification; Associate Purchase vs. Return Summary by Store. Ranked within Region or Store Classification; Highest Returning House Credit Accounts—Accounts Ranked by Total Transactions or items; Highest Returning House Credit Accounts—Accounts Ranked by dollars; Highest Associate House Accounts with Returns—ranked on Total Transactions and Dollars; Highest Associate Accounts with Exchange Transactions—based on Total Transactions; Highest House Charge Accounts with No Receipt Returns; Highest Returning Third Party Charge Accounts—ranked on total Transactions and Dollars; Highest Third Party Charge Accounts with No Receipt Returns ranked by Total Transactions and Dollars; Accounts With Multiple Returns rung by the Same Associate, but on different dates; Accounts With Multiple Returns at the Same Register; Top Registers Processing Returns—summary of all return transactions processed, broken down by type; Return Summary by Store—summary of all returns, broken down by type; Return Summary by Associate—summary of all returns rung, broken down by type; Top Associates with the Highest Average Returns—ranked by average items and average amount; Associates with Average Returns Greater than Store Average Return Amount * 1.25 (or other multiple); Associates with Average Returns Greater than Store Average Return Items * 2 (or other multiple); Associates with Returns Exceeding Department Average by $X or X%; Stores Ranked on Discounts Given Exceeding 50% (or other percent); Transactions Where Item Amount and Discount Rung Net to 0; Duplicate Original Sales Transaction on Returns; Multiple Use of Same Receipt Data on Returns; Returns Made to a Different Tender (Form of Payment) Than Original Transaction; Returns Made Before Store Opening or After Store Closing; Returns Using a Voided Transaction for Original Receipt Data; Returns to Third Party Credit Card with Original Purchase Made on A Different Account; Top Registers Voiding Cash/Cash Equivalent Transactions—based on Total Transactions and Dollars; Top Associates Voiding Cash/Cash Equivalent Transactions—based on Total Transactions and Dollars; Top Associates Voiding Cash/Cash Equivalent Transactions as a Percentage of Sales; Voids of Cash/Cash Equivalent Transactions—Stores Ranked within Region or Store Classification; Top Registers Voiding House Charge Transactions—based on Total Transactions and dollars; Top Associates Voiding House Charge Transactions—based on Total Transactions and Dollars; Top Associates Voiding House Charge Transactions as a Percentage of Sales; Voids of House Charge Transactions—Stores Ranked Within Region or Store Classification; Top Registers Voiding Third Party Charge Transactions—based on Total Transactions and Dollars; Top Associates Voiding Third Party Charge Transactions—based on Total Transactions and Dollars; Top Associates Voiding Third Party Charge Transactions as a Percentage of Sales; Voids of Third Party Charge Transactions—Stores Ranked within Region or Store Classification; Top House Charge Accounts with Voids—by volume (transactions or items) or dollars; Top Third Party Charge Accounts with Voids—by volume (transactions or items) or dollars; Top Registers Voiding Associate Purchases—based on Total Transactions and Dollars; Top Associates Voiding Associate Purchases; Voids of Associate Purchases by Store Stores Ranked; Associates Voiding their Own Purchases; Credit Accounts with Multiple Voids by the Same Associate on Multiple Dates; Credit Accounts with Multiple Voids at the Same Register on Different Dates; Voids of Charge Account Payments; Voids of Layaway Payments; Void Summary by Register—summary of all voids with breakdown by type; Void Summary by Associate—summary of all voids with breakdown by type; Voids not Rung Within Five Transactions of Original Transaction; Voids Rung by Different Associate than Original Transaction; Associates Voiding Transactions which are Subsequently Used as Original Receipt on a Return; Cash Void Followed by a No Sale Within X Transactions; Top Associates Processing Mid-Voids (Transactions Cancels) as a Percentage of Sales; Top Associates with Mid-Void Transactions—based on Total Transactions; Associates Processing Mid-Void of a Cash Transaction Followed by a No Sale; Top Registers Ringing No Sales—based on Total Transactions; Top Associates Ringing No Sales—based on Total Transactions; Top Associates Processing No Sales as a Percent of Sales; Average No Sales by Store—Ranked Within Region or Store Classification; No Sale Transaction Immediately Following a Price Verify; Top Associates Ringing Other Associates' Purchases; Associates Ringing Their Own Purchases; Associate Purchases with Discount Greater Than X%; Associate Purchases with Discount and Markdown Exceeding X%; Sales in a User-Specified Department Which Fall Below $X; Sales Netting to Less Than $X which Contain Line Items Voided; Top Associates Redeeming Store Credits as a Percentage of Sales; Associates with Multiple Redemptions of Same Store Credit; Associates Processing Sales With Variance on Item Price-ranked on total transactions, percent of sales, etc.; Orphan Voids—Void of a Purchase Not Followed by a Subsequent Sale of the Same Item; Associate Numbers Used to Ring Transactions when Associate is not Clocked In; Top Associates who Ring on Registers with Shortage—Occurences or dollars; and combinations thereof.

7. The method of claim 1, further comprising the step of recording image information related to at least one suspect sales transaction.

8. A system for the detection of suspect transactions in a sales environment having point of sale devices and sales locations, comprising:
 (a) means for gathering record information reflecting transactions that have occurred in the environment;
 (b) means for extracting from said record information a plurality of extract records relevant to suspect transactions;
 (c) means for converting said extract records into a form readable by a processor;
 (d) means for reading and analyzing said converted extract records and inputting same to said processor, wherein said processor performs the steps of:
  (1) applying a plurality of exception criteria to said converted extract records to create exception records;
  (2) filtering from said exception records records indicative of suspect transactions;
  (3) ranking said filtered records;
  (4) applying scoring table values to said ranked, filtered records to create scored records; and
  (5) outputting said scored records; and
 (e) means for generating reports from said scored records reflecting suspect transactions.

9. The system of claim 8, further comprising means for employing said scored records to determine the existence of participants in illegal activity.

10. The system of claim 8, further comprising means for employing said scored records to determine frequency of suspect activity occurring at point of sale devices.

11. The method of claim 8, further comprising means for employing said scored records to determine frequency of suspect activity occuring at sales sites.

12. The system of claim 8, wherein said extract records relevant to suspect transactions are selected from the list consisting of sales of selected types; merchandise returns; associates' purchases; post voided transactions; mid-voided transactions; line item voids; no sales, personnel file records; time and attendance records; over/short records for point of sale devices; weekly summary records for sales locations, point of sales devices and associates; and combinations thereof.

13. The system of claim 8, wherein said exception criteria are selected from the list consisting of Top Associates Ringing Cash/Cash Equivalent Returns—based on Total Transactions and dollars; Top Associates Ringing Cash/Cash Equivalent Returns as a Percentage of Sales; Cash/Cash Equivalent Returns by Store, Ranked Within Region or Store Classification; Top Associates Ringing Cash Returns as a Percentage of Their Total Returns; Top Cash/Cash Equivalent Return Registers—based on Total Transactions and Dollars; Top Associates Processing Merchandise Credits as a Percentage of Sales; Top Associates Processing Merchandise Credits as a Percentage of their Returns Rung; Top Associates Processing Multiple Redemptions of Merchandise Credits; Top House Charge Return Register Locations—based on Total Transactions and Dollars; Top Associates Ringing Returns on House Charge—based on Total Transactions and Dollars; Top Associates Ringing Returns on House Charge as a Percentage of Sales; Returns on House Charge by Store, Ranked Within Region or Store Classification; Top Third Party (Bank Card) Charge Return Registers—based on Total Transactions and Dollars; Top Associates Ringing Returns on Third Party Charge—based on Total Transactions and Dollars; Top Associates Ringing Returns on Third Party Charge as a Percentage of Sales; Third Party Charge Returns by Store, Ranked within Region or Store Classification; Top Registers Processing Returns without Receipt—based on Total Transactions and Dollars; Top Associates Ringing No Receipt Returns as a Percentage of Sales; Top Associates Ringing No Receipt Returns as a Percentage of Their Returns Rung; Top Credit Accounts with No Receipt Returns—based on Total Transactions and Dollars; Associates Ringing Their Own Returns; Top Associates Ringing Other Associates' Returns; Top Registers Ringing Associate Returns; Associate Returns by Store, Stores Ranked by Region or Store Classification; Associate Purchase vs. Return Summary by Store, Ranked within Region or Store Classification; Highest Returning House Credit Accounts—Accounts Ranked by Total Transactions or items; Highest Returning House Credit Accounts—Accounts Ranked by dollars; Highest Associate House Accounts with Returns—ranked on Total Transactions and Dollars; Highest Associate Accounts with Exchange Transactions—based on Total Transactions; Highest House Charge Accounts with No Receipt Returns; Highest Returning Third Party Charge Accounts—ranked on total Transactions and Dollars; Highest Third Party Charge Accounts with No Receipt Returns ranked by Total Transactions and Dollars; Accounts With Multiple Returns rung by the Same Associate, but on different dates; Accounts With Multiple Returns at the Same Register; Top Registers Processing Returns—summary of all return transactions processed, broken down by type; Return Summary by Store—summary of all returns, broken down by type; Return Summary by Associate—summary of all returns rung, broken down by type; Top Associates with the Highest Average Returns—ranked by average items and average amount; Associates with Average Returns Greater than Store Average Return Amount * 1.25 (or other multiple); Associates with Average Returns Greater than Store Average Return Items * 2 (or other multiple); Associates with Returns Exceeding Department Average by $X or X%; Stores Ranked on Discounts Given Exceeding 50% (or other percent); Transactions Where Item Amount and Discount Rung Net to 0; Duplicate Original Sales Transaction on Returns; Multiple Use of Same Receipt Data on Returns; Returns Made to a Different Tender (Form of Payment) Than Original Transaction; Returns Made Before Store Opening or After Store Closing; Returns Using a Voided Transaction for Original Receipt Data; Returns to Third Party Credit Card with Original Purchase Made on A Different Account; Top Registers Voiding Cash/Cash Equivalent Transactions—based on Total Transactions and Dollars; Top Associates Voiding Cash/Cash Equivalent Transactions—based on Total Transactions and Dollars; Top Associates Voiding Cash/Cash Equivalent Transactions as a Percentage of Sales; Voids of Cash/Cash Equivalent Transactions—Stores Ranked within Region or Store Classification; Top Registers Voiding House Charge Transactions—based on Total Transactions and dollars; Top Associates Voiding House Charge Transactions—based on Total Transactions and Dollars; Top Associates Voiding House Charge Transactions as a Percentage of Sales; Voids of House Charge Transactions—Stores Ranked Within Region or Store Classification; Top Registers Voiding Third Party Charge Transactions—based on Total Transactions and-Dollars; Top Associates Voiding Third Party Charge Transactions—based on Total Transactions and Dollars; Top Associates Voiding Third Party Charge Transactions as a Percentage of Sales; Voids of Third Party Charge Transactions—Stores Ranked within Region or Store Classification; Top House Charge Accounts with Voids—by volume (transactions or items) or dollars; Top Third Party Charge Accounts with Voids—by volume (transactions or items) or dollars; Top Registers Voiding Associate Purchases—based on Total Transactions and Dollars; Top Associates Voiding Associate Purchases; Voids of Associate Purchases by Store Stores Ranked; Associates Voiding their Own Purchases; Credit Accounts with Multiple Voids by the Same Associate on Multiple Dates; Credit Accounts with Multiple Voids at the Same Register on Different Dates; Voids of Charge Account Payments; Voids of Layaway Payments; Void Summary by Register—summary of all voids with breakdown by type; Void Summary by Associate—summary of all voids with breakdown by type; Voids not Rung Within Five Transactions of Original Transaction; Voids Rung by Different Associate than Original Transaction; Associates Voiding Transactions which are Subsequently Used as Original Receipt on a Return; Cash Void Followed by a No Sale Within X Transactions; Top Associates Processing Mid-Voids (Transactions Cancels) as a Percentage of Sales; Top Associates with Mid-Void Transactions—based on Total Transactions; Associates Processing Mid-Void of a Cash Transaction Followed by a No Sale; Top Registers Ringing No Sales—based on Total Transactions; Top Associates Ringing No Sales—based on Total Transactions; Top Associates Processing No Sales as a Percent of Sales; Average No Sales by Store—Ranked Within Region or Store Classification; No Sale Transaction Immediately Following a Price Verify; Top Associates Ringing Other Associates' Purchases; Associates Ringing Their Own Purchases; Associate Purchases with Discount Greater Than X%; Associate Purchases with Discount and Markdown Exceeding X%; Sales in a User-Specified Department Which Fall Below $X; Sales Netting to Less Than $X which Contain Line Items Voided; Top Associates Redeeming Store Credits as a Percentage of Sales; Associates with Multiple Redemptions of Same Store Credit; Associates Processing Sales With Variance on Item Price-ranked on total transactions, percent of sales, etc.; Orphan Voids—Void of a Purchase Not Followed by a Subsequent Sale of the Same Item; Associate Numbers Used to Ring Transactions when Associate is not Clocked In; Top Associates who Ring on Registers with Shortage—Occurrences or dollars; and combinations thereof.

14. The system of claim 13, further comprising at least one surveillance camera for recording image information related to at least one suspect sales transaction.

15. A system for the detection of suspect sales transactions in a sales environment having point of sale devices and sales locations, comprising:
  (a) first processor means comprising:
    (1) means for gathering record information reflecting sales transactions that have occurred in the environment;
    (2) means for extracting from said record information a plurality of extract records relevant to suspect transactions;
    (3) means for converting said extract records into a form readable by a second processor;
  (b) second processor means for reading and analyzing said converted extract records and inputting same to said processor, wherein said second processor performs the steps of:
    (1) applying a plurality of exception criteria to said converted extract records to create exception records;
    (2) filtering from said exception records records indicative of suspect transactions;
    (3) ranking said filtered records;
    (4) applying scoring table values to said ranked, filtered records to create scored records; and
    (5) outputting said scored records;
  (c) means for generating reports from said scored records reflecting suspect sales transactions; and
  (d) at least one surveillance camera for recording image information related to at least one suspect sales transaction.

16. The system of claim 15, wherein said image information is video tape.

17. The system of claim 15, wherein each point of sale device has associated therewith one of said at least one surveillance camera.

18. The system of claim 17, further comprising a storage device for periodically receiving and storing said recorded image information.

19. The system of claim 18, further comprising means for accessing said storage device to present recorded image information in connection with reports generated by said means for generating reports.

* * * * *